United States Patent [19]

Jarman

[11] 4,068,753
[45] Jan. 17, 1978

[54] SHEAR FRONT FEED SYSTEM
[75] Inventor: David J. Jarman, Aurora, Ind.
[73] Assignee: Continental M.D.M., Inc., Aurora, Ind.
[21] Appl. No.: 663,669
[22] Filed: Mar. 4, 1976
[51] Int. Cl.² .............................................. B65G 47/24
[52] U.S. Cl. ............................ 198/373; 193/35 MD; 198/471
[58] Field of Search ................... 198/20 R, 21, 127 R, 198/234, 485, 471, 463, 373; 193/35 MD

[56] References Cited

U.S. PATENT DOCUMENTS

| | | | |
|---|---|---|---|
| 2,603,338 | 7/1952 | Fried | 198/485 |
| 2,793,693 | 5/1957 | Menk | 193/35 MD |
| 2,848,095 | 8/1958 | Dolle | 198/20 R |
| 3,100,039 | 8/1963 | Oderman et al. | 198/20 R X |
| 3,710,917 | 1/1973 | Black et al. | 193/35 MD |
| 3,747,736 | 1/1973 | Kornylak | 198/234 X |

FOREIGN PATENT DOCUMENTS 2,326,228  12/1974  Germany ..................... 193/35 MD Primary Examiner—Robert W. Saifer
Assistant Examiner—Douglas D. Watts
Attorney, Agent, or Firm—Alter and Weiss

[57] ABSTRACT

A front feed system including powered roller means for feeding sheet metal into the front of a shear. Elevatable ball transfer means are provided for facilitating setting the sheet metal at various angles to the blade as desired by the operator.

3 Claims, 3 Drawing Figures

SHEAR FRONT FEED SYSTEM

This invention is concerned with auxiliary shear equipment. More particularly, it is concerned with front feed equipment for facilitating the feeding of sheet metal into the front of the shear for shearing action thereon.

There is presently available equipment for feeding the sheet metal into the front shears. In the past, prior to the provision of such equipment it was necessary for the operators of the shear to physically shift the sheet metal to obtain the angle desired for cutting it by the shear.

Recently, automatic equipment has been provided to feed the sheet metal into the shear; however, this automatic equipment lacks versatility, in that it does not provide for manipulation of the sheet metal to obtain angular cuts as may be desired. For example, if it is desired to cut off corners, or cut the sheet metal at angles, the operator of the shear presently has to physically manually shift the sheet metal. This usually requires calling for the assistance of another operator. Besides being wasteful of manpower, it also creates unsafe conditions; i.e., when more than one operator at a time is utilizing the shear equipment.

Accordingly, an object of the present invention is to provide improvement over the presently available front feed systems for shears.

A related object of the present invention is to provide front feed systems including means for facilitating the transverse motion of the sheet metal in addition to moving the sheet metal longitudinally into the shear blade cutting area.

Yet another object of the present invention is to provide means for facilitating the transverse and angular motion of the sheet metal into the cutting area of the shear.

Still another object of the present invention is to provide removable means for facilitating angular motion of the sheet material.

Yet another object of the present invention is to provide powered roller means for moving the sheet metal to be sheared into the cutting portion of the shear and at the same time providing means which make it possible for a single operator to readily and efficiently move the sheet metal transversely and/or diagonally into the cutting area of the shear equipment.

In accordance with a preferred embodiment of the invention a front feed system comprises means, such as powered rollers, for moving the sheet material longitudinally into the cutting area. Ball transfer means are also provided which can be elevated or lowered in accordance with the necessity of utilization. The ball transfer means comprise bearing mounted spheroids, which are elevated above the rollers to enable the operator to readily and easily hand move the sheet longitudinally, transversally or diagonally as desired into the cutting area of the roller.

The above mentioned and other objects and features of the present invention will be best understood by making reference to the accompanying drawings; where:

Figure 1:
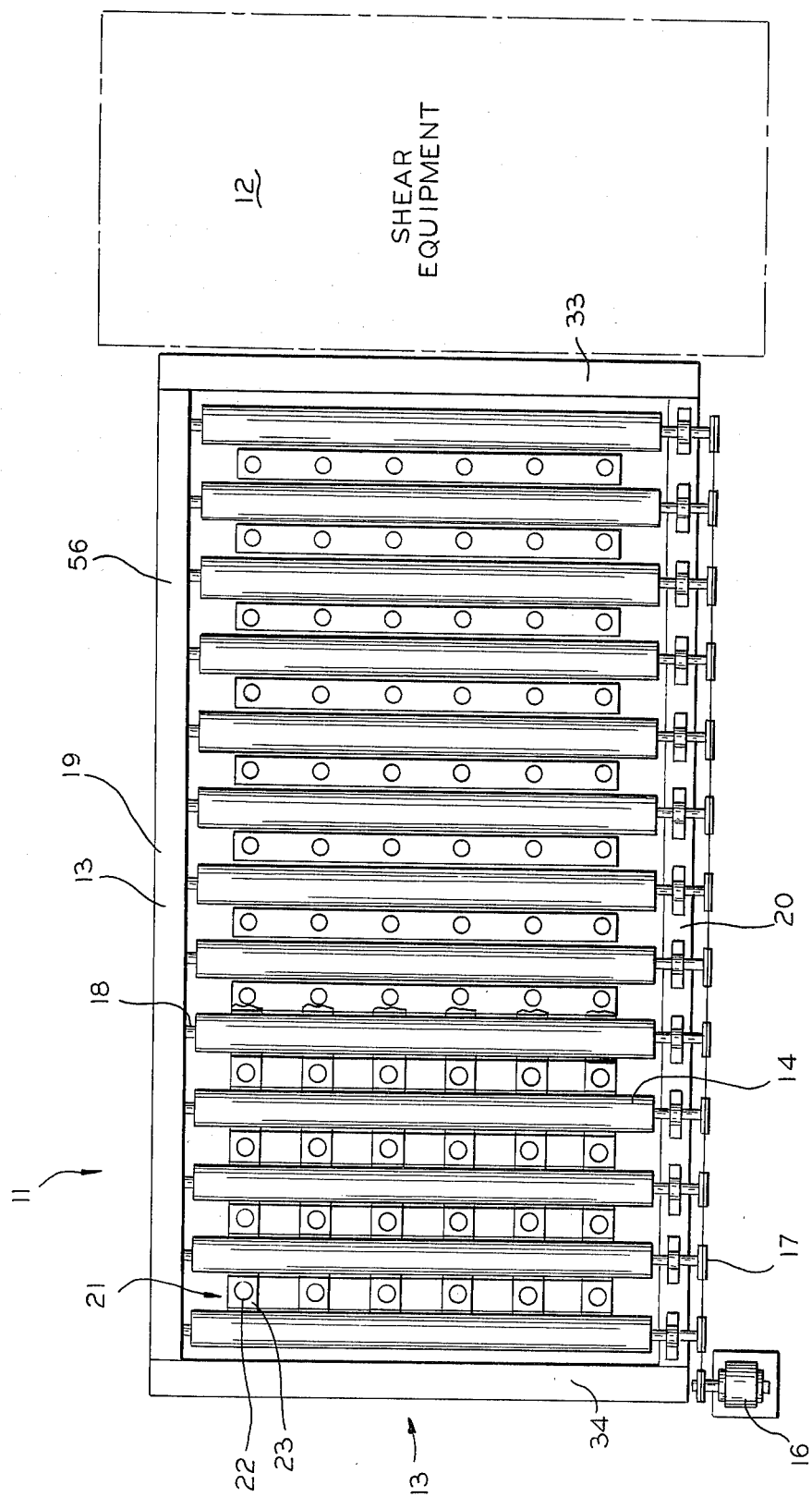
FIG. 1 is a plan view of the inventive front feed control system.

FIG. 1 shows a front feed system for introducing sheet metal to be sheared into the cutting area of the shear. The whole system is generally shown at 11. The shear equipment which is fed by the system is shown generally as block diagram 12. A conveyor means for feeding the sheet metal into the cutting area of the shear equipment 12 is shown at 13 as a powered roller table. The powered rollers, such as roller 14, for example, are driven by a motor (not shown) through a gear reducer 16. Each of the powered rollers is attached to the gear reducer through power transmission means, such as a chain, not shown, by drive wheels, such as drive wheel 17.

The powered rollers normally turn selectively either in a clockwise or counter-clockwise direction to drive the sheet metal towards the shear equipment 12, or away from the shear equipment 12. The rollers are preferably rubber or plastic lined to minimize marring the sheet metal. The rollers rotate around axles, such as axle 18, which preferably are bearing mounted, in parallel rails 19 and 20.

In FIG. 1 rail 19 is shown covered by a protective sheet metal enclosure 21. Rail 20 is shown without its protective sheet metal enclosure.

Oppositely disposed to rail 19 is a parallel rail, not shown in this drawing, to better show the axles of the rollers.

Means are provided for enabling the operator of the equipment to move the sheet metal either transverse to the longitudinal direction otherwise followed by the material as caused from the movement of the powered rollers, or in a diagonal direction relative to the shear equipment. These means are the ball transfer means, generally shown as 21 in FIG. 1.

The ball transfer means includes bearing mounted spheroids, such as spheroid 22, which are mounted in a bearing block 23. The bearing blocks are arranged in rows with rollers between the rows. This bearing mounted ball transfer equipment is shown in FIG. 1 as being only between some of the rollers of the front feed equipment. However, the ball transfer equipment is preferably mounted between each of the rollers to thereby be able to fully and firmly support even the thinnest gauge material being processed in the shearing equipment.

Figure 2:
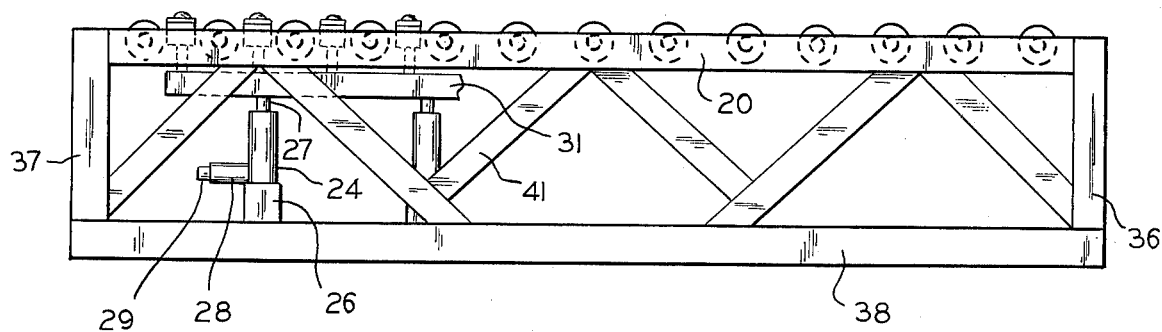
FIG. 2 is a side view of the system of FIG. 1.

Means are provided, as better shown in FIG. 2, for elevating or lowering the ball transfer equipment as desired. This means is shown as fluid operated cylinders, such as cylinder 24. The cylinder is shown as mounted on a base, such as block 26, and having a piston 27 extending from the cylinder. A valve 28, preferably electrically operated by a solenoid 29, is shown mounted to the cylinder.

The pistons operate in unison and are coupled to a means for supporting the ball transfer equipment. More particularly, as shown in FIG. 2, the pistons are coupled to member 31. Member 31 is preferably a hollow tube-like member extending longitudinally to encompass all of the ball transfer means over the entire conveyor.

Preferably pairs of cylinders are mounted on opposite sides of the conveyor means under the longitudinally extending hollow cylindrical members, such as member 31, and the oppositely disposed cylinders are coupled together to operate jointly.

Transverse members not shown couple the oppositely disposed longitudinal parallel members 31. Single hydraulic cylinders could be mounted midway on such transverse members to enable lifting and lowering the ball transfer means as required.

Figure 3:
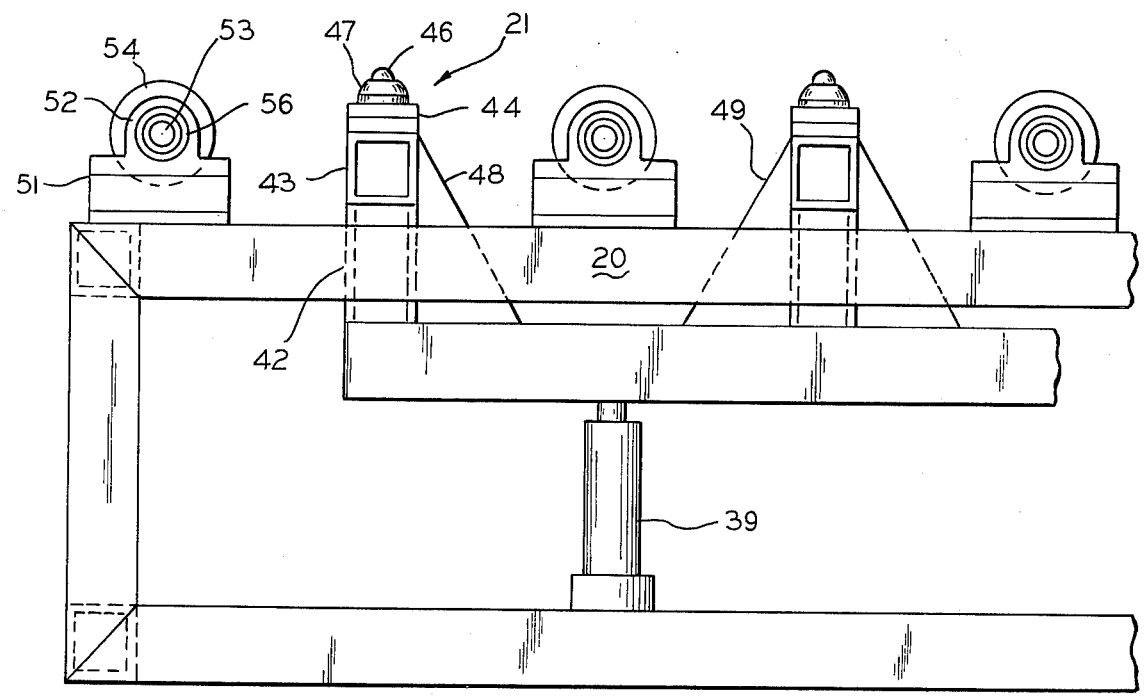
FIG. 3 shows details of the sheet metal transfer means that are shown generally in FIGS. 1 and 2.

As best seen in FIG. 1, there are transverse members on the powered roller conveyor means, such as transverse member 33 and transverse member 34 at the shear side of the conveyor, and opposite to the shear side of the conveyor, respectively. These members, as seen in FIG. 2 are supported by pillar-like standards 36 and 37, respectively. The pillar-like standards are set on a base member, such as base member 38, Additional standards may be utilized for supporting the upper surface, or the roller support members, such as 19 and 20. Such an additional standard is shown in FIG. 3 as standard 39. Alternatively, biased members, such as member 41, can be used to support the longitudinal members 19 and 20 which support the rollers, As best seen in FIG. 3, all of the frame members are preferrably hollow tube-like structures. The ball transfer members, such as ball transfer member 21, comprises a ball transfer support such as standard 42, also comprised of a hollow tube-like member. The standard 42 is located on one side of the conveyor. An oppositely disposed standard is mounted on the other side of the conveyor. Across the top of each of the standards is a transverse member 43. On top of the transverse member is a pad 44. The pad 44 holds the actual ball transfers, such as ball transfer 46, mounted in a bearing block 47. A plurality of such ball transfers are mounted between each roller or between alternate rollers as desired. The standards, such as standard 42, may be braced by means, such as brackets 48 and 49, for example.

As also best seen in FIG. 3, the rollers themselves are supported between longitudinal members 19 and 20 upon which are mounted pillow blocks, such as pillow block 51, having yokes, such as yoke 52, mounted thereon. The yoke member receives the axles, such as axle 53, upon which rollers, such as roller 54, rotates. Bearings, such as bearing 56, are provided within yoke 52. A cover plate is preferrably provided, such as cover plate 56, shown in FIG. 1. The cover plate covers the top and the sides of the yoke in addition to covering the sprocket wheel 17, which is used to drive the rollers, such as roller 14.

In operation then the ball transfers are lowered by causing the cylinders to pull in their pistons thereby lowering longitudinal member 31 and the ball transfers mounted thereon until the actual rotating balls, such as ball 46, are below the top of the rollers. Then the rollers themselves are power driven, the sheet material is placed upon the rollers and driven toward the shear equipment 12. Subsequently, the ball transfer means are raised to support the sheet material. The sheet material is then shifted into a position desired, such as with one corner of the sheet under the shear. The ball transfer means are lowered and the rollers may then again be operated to move the sheet forward or backward as desired.

The shear equipment is then operated to cut the sheet material. If it is desired to reposition the sheet material again, the ball transfer means are raised and the sheet material is manually positioned as desired. Prior to the cutting the ball transfer means are preferrably lowered.

While the principles of the invention have been described above in connection with specific apparatus and applications, it is to be understood that this description is made only by way of example and not as a limitation on the scope of the invention.

I claim:

1. A shear front feed system for feeding sheet metal into the front of a shear,
    said system including conveyor means for receiving said sheet metal and transferring it to the front of the shears for shearing operations,
    said conveyor means having a sheet metal receiving end remote from said shears and a sheet metal transferring end adjacent said shears,
    said transfer end being separated from said receiving end by the length of said conveyor means,
    said conveyor means comprising a plurality of parallel spaced apart powered roller means for moving the sheet metal in a substantially straight line from the receiving end to the transferring end,
    each of said roller means extending from one side of the conveyor means to the opposite side transverse to the length of the conveyor means from the receiving end to the transferring end,
    ball transfer means free to rotate in any direction mounted on said conveyor means for facilitating the movement of the sheet metal from the normal straight line motion actuated by the roller means to thereby present the sheet metal at a selected one of various angles to the blade of the shear; and means for lifting said ball transfer means to a position above said powered roller means to separate said sheet metal from said roller means for reorientation upon said ball transfer means,
    said ball transfer means being arranged in spaced apart rows with said rows being located transversely between each of said spaced apart roller means.

2. The shear front feed system of claim 1 wherein means are provided for selectively simuttaneously elevating and lowering all of the ball transfer means,
    said ball transfer means being elevated above the conveyor surface when in use and being lowered below the conveyor surface when not in use.

3. The shear front feed system of claim 1 including a pair of spaced apart first longitudinal members,
    said first pair of spaced apart parallel longitudinal members supported by a plurality of standards at each end of said pair of longitudinal members,
    said powered rollers mounted transverse to said pair of longitudinal members and supported thereon,
    said ball transfer means comprising a second pair of longitudinal members,
    said second pair of longitudinal members being parallel to said first longitudinal members, but spaced apart at a distance that is less than the distance between said first pair of longitudinal members,
    transverse members bridging said second pair of longitudinal members,
    said ball transfer means including ball transfer units mounted on said transverse members,
    said transverse members being located between powered rollers,
    said ball transfer units having individual spheres mounted on ball bearings on beds in rows on said transverse members,
    fluid cylinder means mounted to control the elevation of said second pair of longitudinal members, and
    piston means extending from said cylinder means to means for connection to said second pair of longitudinal members so that when said piston means are extended said second pair of longitudinal members and all of said ball transfer units between each of said rollers are simultaneously elevated.

\* \* \* \* \*